United States Patent [19]

Wittich et al.

[11] Patent Number: 4,826,254
[45] Date of Patent: May 2, 1989

[54] HYDRAULIC DUAL-CIRCUIT EXTERNAL POWER BRAKE VALVE OF TANDEM DESIGN

[75] Inventors: Kurt Wittich, Florsbachtal; Harald Hofstotter, Lohr/Main, both of Fed. Rep. of Germany

[73] Assignee: Mannesmann Rexroth GmbH, Lohr/Main, Fed. Rep. of Germany

[21] Appl. No.: 938,709

[22] Filed: Dec. 8, 1986

[30] Foreign Application Priority Data

Dec. 23, 1985 [DE] Fed. Rep. of Germany ....... 3545975

[51] Int. Cl.$^4$ .................. F16B 11/00; B60T 11/28; B60T 13/14
[52] U.S. Cl. .................... 303/6.01; 60/550; 60/589; 91/530; 303/22.1; 303/9.61
[58] Field of Search .............. 303/22 R, 6 R, 6 C, 303/22.8, 22.1, 6.01, 9.61; 60/528, 591, 563, 533, 550, 555, 556, 557, 558, 559, 560, 589; 137/596, 14; 91/530

[56] References Cited

U.S. PATENT DOCUMENTS

| | | | |
|---|---|---|---|
| 3,712,177 | 1/1973 | Bach et al. | 91/369 A |
| 4,251,114 | 2/1981 | Belart | 303/6 A |
| 4,441,320 | 4/1984 | Gaiser | 60/589 |
| 4,667,476 | 5/1987 | Takata et al. | 60/550 X |
| 4,671,168 | 6/1987 | Sauvee et al. | 60/589 |

FOREIGN PATENT DOCUMENTS

| | | |
|---|---|---|
| 2133316 | 1/1973 | Fed. Rep. of Germany . |
| 2164592 | 6/1973 | Fed. Rep. of Germany . |
| 2818533 | 10/1979 | Fed. Rep. of Germany . |
| 2164934 | 8/1973 | France ............... 60/563 |
| 1410350 | 10/1975 | United Kingdom . |

Primary Examiner—Duane A. Reger
Assistant Examiner—Matthew C. Graham

[57] ABSTRACT

A hydraulic dual-circuit external power brake valve of tandem design has a primary control piston and a secondary control piston, both of which are located in a valve bore of the dual-circuit external power brake valve. The control pistons are provided with bores for connection of a primary brake circuit and a secondary brake circuit to a pressure reservoir and an equalizing tank, and are movable within the valve bore. The regulating force necessary for the motion is introduced into the dual-circuit external power brake valve by a regulating spring. A pressure-transmitting piston between the primary control piston and the regulating spring. The primary control piston on its two end faces, and the pressure-transmitting piston on its face toward the primary piston, are subjected to the pressure acting in the primary brake circuit. When the primary brake circuit is intact, the pressure-transmitting piston is actuated by the regulating spring. When the primary brake circuit is defective, a positioning pin acts on the pressure-transmitting piston.

16 Claims, 1 Drawing Sheet

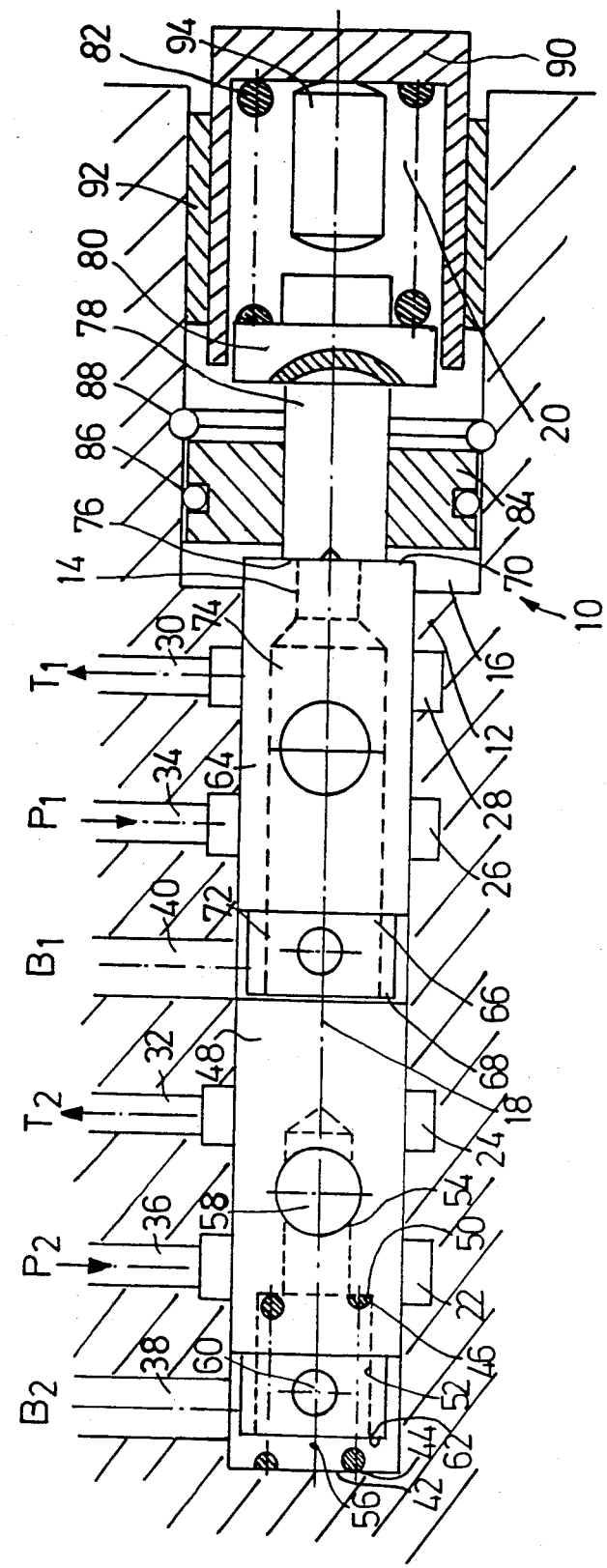

HYDRAULIC DUAL-CIRCUIT EXTERNAL POWER BRAKE VALVE OF TANDEM DESIGN

BACKGROUND OF THE INVENTION

This invention concerns a hydraulic dual-circuit external power brake valve of tandem design.

Such dual-circuit external power brake valves have two control pistons independent of one another, each of which provides for one of the two brake circuits. The two control pistons are located in series in the dual-circuit external power brake valve.

In dual-circuit external power brake valves with control pistons arranged in series, the regulating spring or main spring must be designed so that an equilibrium is reached between the pressure forces on the faces of the control pistons plus the spring force of the restoring spring.

In the hydraulic dual-circuit external power brake valves known up to now, this situation results in the following drawbacks under high brake pressures: the structural space necessary for the main spring or regulating spring is relatively large. In order to reduce the structural space, the spring constant of the regulating spring must be chosen to be disproportionately high. This impairs the apportioning capability of the entire brake system. Furthermore, the regulating reactions of the control pistons can be felt in the foot of the driver. To reduce the restoring forces of the control pistons, the diameter of the control pistons must be reduced, whereby acceptable spring dimensions can be achieved. However, this presents manufacturing difficulties in the production of the case of the dual-circuit external power brake valve.

BRIEF DESCRIPTION OF THE INVENTION

It is an object of this invention to provide a hydraulic dual-circuit external power brake valve wherein the main spring or regulating spring is decoupled from the structural design of the control pistons.

In accordance with an embodiment of this invention, by positioning the pressure-intensifying piston between the regulating spring and the primary control piston, it is assured that the primary control piston is set into motion directly with appropriate actuation of the spring, while the force acting on the primary control piston because of the pressure prevailing in the primary brake circuit no longer has to be absorbed completely by the regulating spring. This result is possible because the two faces of the primary control piston are acted on by the pressure prevailing in the primary brake circuit. The regulating spring has to absorb only the force that is transmitted to it by the pressure-transmitting piston. The force transmitted by the pressure-transmitting piston depends directly on the dimensions of its face exposed to the pressure in the primary brake circuit. By appropriate design of the face, it is possible to keep the force to be transmitted comparatively small. The regulating spring must be designed for this force. Because of the free choice of diameter of the pressure-transmitting piston, a regulating spring with a small structural volume can be used independently of the desired maximum brake pressure. Furthermore, the diameter of the section of the valve bore in which the control pistons rest can be chosen in accordance with the requirements. With a small diameter of the pressure-transmitting piston, a shallow rising characteristic of the regulating spring can be formed, so that the regulating reaction of the control pistons on the driver's foot can no longer be felt. In case of the failure of the primary brake circuit, the maximum brake pressure can nevertheless be reached because of the mechanical engagement between the positioning pin and the secondary control piston.

The embodiment of the invention provides a direct connection between the two faces of the primary control piston. This reduces the time delay between the actuation of the brake pedal and the buildup of the brake pressure. The embodiment of the invention provides reliable guidance of the pressure-intensifying piston even when the section of the valve bore holding the regulating spring has a diameter that is large in comparison with the section of the valve bore holding the control pistons. The embodiment of the invention permits a low-cost fastening of the bushing inside the transmission section of the valve bore. Because of the movability of the bushing, the mechanical engagement between the positioning pin and the secondary control piston is provided for in a simple manner. In accordance with the invention, the regulating spring and the positioning pin can beneficially be held in a common spring sleeve, with the positioning pin at the same time being able to serve for the correct orientation of the regulating spring inside the spring sleeve. According to the embodiment of the invention, the stroke of the spring sleeve can be limited in a beneficial manner by the bushing if the appropriate pressure is made available in the primary brake circuit. This assures constant operating conditions for the normal operation of the dual-circuit external power brake valve. In the embodiment of the invention a failure of the primary brake circuit leads in a beneficial manner to a direct mechanical engagement between the positioning pin and the secondary control piston.

BRIEF DESCRIPTION OF THE DRAWING

The invention will now be explained in detail using an example of embodiment with reference to the drawing. The FIGURE shows in cross section a preferred example of embodiment of the hydraulic dual-circuit external power brake valve of tandem design pursuant to the invention.

DETAILED DESCRIPTION OF THE INVENTION

A dual-circuit external power brake valve 10, as shown in the FIGURE, has a housing 12 in which there is a valve bore 14. The valve bore 14 has a radial step 16 by which the valve bore 14 is divided into a functional section 18 and a transmission section 20. The transmission section 20 has a larger diameter than the functioning section and is open to the outside.

The functional section 18 has four connecting ring chambers 22, 24, 26, 28, that are arranged in pairs, with a specific spacing between the pair consisting of the connecting ring chambers 22, 24 and the pair formed by the connecting ring chambers 26, 28. The spacing between the connecting ring chambers 22 and 24 is the same as the spacing of the connecting ring chambers 26 and 28 from one another. The connecting ring chambers 24 and 28 are connected to an equalizing tank T, not illustrated, by channels 30, 32 in the case 12. The connecting ring chambers 22, 26 are likewise connected to a pressure reservoir P, not illustrated, by channels 36, 34 in the case 12. The functional section 18 is connected near the base side 42 and the valve bore 14 to a secondary brake circuit B₂ by a pressure line 38, and to a primary brake circuit B₁ between the two pairs of connecting ring chambers 22, 24 and 26, 28, through a pressure line 40.

A restoring spring 44 is fastened to the base side 42 of the valve bore 14. The other end of the restoring spring 44 is placed on a radial step 46 by which a bore 50 in the secondary control piston 48 is divided into two sections 52, 54. The secondary control piston 48 jointly with the case 12 forms a secondary pressure chamber 56. The section 54 located near the base of the bore 50 can be connected by means of a radial bore 58 both to the connecting ring chamber 24 and to the connecting ring chamber 22. There is a radial bore 60 in the section 52 of the bore 50 through which the bore 50 remains connected to the secondary pressure chamber 56 even when the face 62 of the secondary control piston 48 facing the base 42 of the valve bore 14 rests against the base 42, opposing the force of the restoring spring 44. This assures a connection between the pressure line 38 and the bore 50 for this case also.

The secondary control piston 48 at its terminal section located near the base 42 of the valve bore 14 has a smaller outside diameter than over the rest of its length.

The radial bore 60 in this section is arranged with a smaller outside diameter.

In the area of the functional section 18 located near the transmission section 20, there is a primary control piston 64. The primary control piston 64 at its terminal section facing the base 42 has a smaller diameter than over the rest of its length. A channel 66 extends along the entire axial length of the primary control piston 64, by which the two faces 68, 70 of the primary control piston 64 are connected to one another. There is a radial bore 72 in the section with the smaller outside diameter, through which the channel 66 is connected to the pressure line 40 even when the face 68 of the primary control piston 64 opposite the secondary control piston 48 rests against the face of the secondary control piston 48 opposite it. There is another radial bore 74 approximately in the center of the section of the primary control piston 64 with the larger outside diameter, through which the channel 66 can be brought into connection both with the channel 30 and with the channel 34 through the connecting ring chambers 26 and 28. The face 70 of the primary control piston 64 is located near the radial step 16 of the case 12, and in the operation of the dual-circuit external power brake valve 10, it moves into the transmission sections of both the functional section 18 and of the transmission section 20 located on both sides of the radial step 16.

Opposite the face 70 of the primary control piston 64 there is the face 76 of a pressure-transmitting piston 78 that is pressed constantly in position against the face 70 of the primary control piston through a spring seat 80 by a regulating spring 82. The pressure-transmitting piston 78 is guided in a bushing 84 that surrounds it annularly and is placed with axial movability inside the transmission section 20 of the valve bore 14. A gasket 86 is placed between the bushing and the inside wall of the transmission section 20, which seals off the section of the transmission section toward the opening area of the valve bore 14 from the transition region located near the radial step 16. The pressure-transmitting piston 78 can move in the bushing 84. The bushing 84 can move inside a section of the transmission section 20 that extends from the radial step 16 to a detent ring 88, that is stationary in the transmission section 20.

The other end of the regulating spring 82, that rests on the spring seat 80, is fastened to the inside of a cylindrical spring sleeve 90 open at one end. The spring sleeve 90 is movable in the transmission section 20 of the valve bore and is guided within this transmission section by a guide element 92. The inside of the face of the spring sleeve 90 is provided with a positioning pin 94 inside the regulating spring 82, which comes into contact with the spring seat 80 when the regulating spring 82 is compressed beyond a prescribed amount. The side of the spring seat 80 opposite the seat face of the spring 82 is in constant contact with the face of the pressure-transmitting piston 78 opposite it because of the force of the regulating spring 82.

In the normal operation of the dual-circuit external power brake valve 10, i.e., both the primary brake circuit B₁ and the secondary brake circuit B₂ are intact, when the spring sleeve 90 is actuated by the regulating spring 82, the pressure-intensifying piston 78 is moved, and in turn it moves both the primary control piston 64 and the secondary control piston 48 toward the base 42 of the valve bore 14. The radial bores 58, 60, and 72, 74 first close the channels 30 and 32 because of their motion, and immediately thereafter they open the channels 34 and 36. The pressure for the secondary brake circuit B₂ then builds up in the secondary pressure chamber 56, with the secondary control piston 48 being pressed further toward the base 42 of the valve bore 14 by the pressure building up in the primary brake circuit B₁. The primary control piston 64 is acted on by the pressure of the primary brake circuit B₁ at its two faces 68, 70 because of the channel 66, i.e., it is pressure-equalized. The pressure of the primary brake circuit acts on the face 76 of the pressure-transmitting piston 78 through the channel 66 and thus maintains the equilibrium with the actuating force on the spring sleeve 90. The maximum spring force is reached when the spring sleeve 90 strikes the bushing 84. Since the bushing 84 is subjected to the pressure of the primary brake circuit B₁ on its other face, it nevertheless remains firmly clamped against the detent ring 88. The maximum possible brake pressure is determined by the spring constant of the regulating spring 82 used.

In case of the failure of the secondary brake circuit, the pressure building up in the primary brake circuit B₁ moves the primary control piston 64 toward the base 42. The mode of action of the still intact primary brake circuit 1 and the actuation of the dual-circuit external power brake valve 10 occurs similarly to the mode of operation described above.

In case of the failure of the primary brake circuit, the actuation of the secondary brake circuit occurs through the mechanical contact between the primary control piston 64 and the secondary control piston 48. Corresponding to the area ratio between the face 76 of the pressure-transmitting piston 78 and the faces 68 70 of the primary control piston 64, the maximum brake pressure achievable by the regulating spring 82 is smaller. In the further passage of the brake pedal, the bushing 84 is moved and the positioning pin 94 comes into contact with the spring seat 80. With the direct engagement from the brake pedal to the secondary control piston 48 of the secondary brake circuit B₂, the maximum brake pressure can then be reached again with higher foot force.

A hydraulic dual-circuit external power brake valve of tandem design has a primary control piston and a secondary control piston, both of which are located in a valve bore of the dual-circuit external power brake valve. The control pistons are provided with bores for connection of a primary brake circuit and a secondary brake circuit to a pressure reservoir and an equalizing tank, and are movable inside the valve bore. The regulating force necessary for the motion is introduced into the dual-circuit external power brake valve by means of a regulating spring. There is a pressure-transmitting piston between the primary control piston and the regulating spring. The primary control piston on its two faces, and the pressure-transmitting piston on its face toward the primary piston, are subjected to the pressure acting in the primary brake circuit. When the primary brake circuit is intact, the pressure-transmitting piston is actuated by the regulating spring. If the primary brake circuit is defective, a positioning pin also acts on the pressure-transmitting piston.

Various modifications in structure and/or function may be made to the disclosed embodiments by one skilled in the art without departing from the scope of the invention as defined by the claims.

What is claimed is:

1. A hydraulic dual circuit external power brake valve of tandem design comprising:
   a valve housing having a valve bore;
   a primary control piston adjustably movably disposed within the valve bore and having opposed end faces;
   a secondary control piston adjustably movably disposed within the valve bore;
   primary and secondary brake circuits in fluid connection with respective primary and secondary control pistons and a fluid pressure source;
   a regulating spring means for providing an adjustable actuating force to the primary and secondary control pistons and to an intermediate pressure transmitting piston movably disposed between the spring means and the primary control piston, the intermediate piston having an end face in direct pressure contacting relationship with one opposed end face of the primary control piston, whereby the fluid pressure being applied to the primary brake circuit is applied to the opposed end faces of the primary control piston and to the end face of the intermediate piston when the primary brake circuit is operative, and
   a positioning pin means for actuating the intermediate piston when the primary brake circuit is inoperative.

2. Hydraulic dual-circuit external power brake valve according to claim 1, wherein the two end faces of the primary control piston are in pressure connection with one another by means of a channel located within the housing.

3. Hydraulic dual-circuit external power brake valve according to claim 1 or 2, wherein the pressure-transmitting piston is guided in a bushing mounted movably in the housing.

4. Hydraulic dual-circuit external power brake valve according to claim 3, wherein a face of the bushing facing toward the primary control piston is acted on by the pressure acting in the primary brake circuit.

5. Hydraulic dual-circuit external power brake valve according to claim 4 wherein the regulating spring and the positioning pin are located in a spring sleeve.

6. Hydraulic dual-circuit external power brake valve according to claim 5 wherein the stroke of the spring sleeve is limited by the bushing when the primary brake circuit is intact.

7. Hydraulic dual-circuit external power brake valve according to claim 5 wherein the bushing can be moved by the spring sleeve when the primary brake circuit is defective.

8. Hydraulic dual-circuit external power brake valve according to claim 5 wherein the path of motion of the bushing and the length of the positioning pin cooperate with one another in such a way that when the bushing is moved by the spring sleeve there is a mechanical engagement between the positioning pin and the secondary control piston.

9. Hydraulic dual-circuit external power brake valve according to claim 3 wherein the regulating spring and the positioning pin are located in a spring sleeve.

10. Hydraulic dual-circuit external power brake valve according to claim 9 wherein the stroke of the spring sleeve is limited by the bushing when the primary brake circuit is intact.

11. Hydraulic dual-circuit external power brake valve according to claim 9 wherein the bushing can be moved by the spring sleeve when the primary brake circuit is defective.

12. Hydraulic dual-circuit external power brake valve according to claim 9 wherein the path of motion of the bushing and the length of the positioning pin cooperate with one another in such a way that when the bushing is moved by the spring sleeve there is a mechanical engagement between the positioning pin and the secondary control pistion.

13. Hydraulic dual-circuit external power brake valve according to one of the claims 1 or 2 wherein the regulating spring and the positioning pin are located in a spring sleeve.

14. Hydraulic dual-circuit external power brake valve according to claim 13, wherein the stroke of the spring sleeve is limited by the bushing when the primary brake circuit is intact.

15. Hydraulic dual-circuit external power brake valve according to claim 14, wherein the bushing can be moved by the spring sleeve when the primary brake circuit is defective.

16. Hydraulic dual-circuit external power brake valve according to claim 15, wherein the path of motion of the bushing and the length of the positioning pin cooperate with one another in such a way that when the bushing is moved by the spring sleeve there is a mechanical engagement between the positioning pin and the secondary control piston.

* * * * *